United States Patent [19]
Dix et al.

[11] Patent Number: 6,114,061
[45] Date of Patent: *Sep. 5, 2000

[54] BATTERY ELECTRODES, BATTERIES, AND METHODS OF FORMING BATTERIES AND BATTERY ELECTRODES

[75] Inventors: Eric R. Dix; Weihong Li, both of Boise, Id.

[73] Assignee: Micron Technology, Inc., Boise, Id.

[*] Notice: This patent issued on a continued prosecution application filed under 37 CFR 1.53(d), and is subject to the twenty year patent term provisions of 35 U.S.C. 154(a)(2).

[21] Appl. No.: 09/022,953

[22] Filed: Feb. 12, 1998

[51] Int. Cl.$^7$ ................................................ H01M 6/12
[52] U.S. Cl. .................... 429/162; 429/212; 429/213; 429/217; 429/224; 429/231.7; 29/623.1; 29/623.2
[58] Field of Search ........................... 429/212, 213, 429/217, 224, 231.7, 162; 29/623.1, 623.2

[56] References Cited

U.S. PATENT DOCUMENTS

| | | | |
|---|---|---|---|
| 4,684,591 | 8/1987 | Okamura et al. | 429/218 |
| 4,710,439 | 12/1987 | Tarascon | 429/194 |
| 5,192,629 | 3/1993 | Guyomard et al. | 429/197 |
| 5,443,930 | 8/1995 | Shoji et al. | 429/224 |
| 5,456,000 | 10/1995 | Gozdz et al. | 29/623.2 |
| 5,460,904 | 10/1995 | Gozdz et al. | 429/192 |
| 5,470,357 | 11/1995 | Schmutz et al. | 29/623.5 |
| 5,542,959 | 8/1996 | Tuttle | 29/623.3 |
| 5,609,975 | 3/1997 | Hasegawa et al. | 429/217 |
| 5,618,640 | 4/1997 | Idota et al. | 429/194 |
| 5,667,916 | 9/1997 | Ebel et al. | 429/218.1 |
| 5,705,292 | 1/1998 | Yukita et al. | 429/137 |
| 5,778,515 | 7/1998 | Menon | 29/623.4 |
| 5,783,331 | 7/1998 | Inoue et al. | 429/217 |

OTHER PUBLICATIONS

Technical Brochure: "Kynar and Kynar Flex PVDF", Elf Atochem North America, Inc., 16 pages, pp. 1–14, No date available.

Product Information: "Kynar 740 Pellets/Kynar 741 Powder", Elf Atochem North America, Inc., Nov. 1993, 15 pages, No date available.

*Primary Examiner*—Laura Weiner
*Attorney, Agent, or Firm*—Wells, St. John, Roberts, Gregory & Matkin

[57] ABSTRACT

The invention encompasses batteries, battery electrodes and methods of forming batteries and battery electrodes. In one aspect, the invention includes a mixture of PTFE and a compound selected from the group consisting of PVDF, copolymers of vinylidene fluoride and hexafluoropropylene, and mixtures thereof in a cathode binder. In another aspect, the invention includes a battery electrode comprising PTFE and a compound selected from the group consisting of PVDF, copolymers of vinylidene fluoride and hexafluoropropylene, and mixtures thereof. In another aspect, the invention includes a battery comprising: a) a cathode; b) an anode; and c) wherein at least one of the cathode or the anode comprises PTFE and a compound selected from the group consisting of PVDF, copolymers of vinylidene fluoride and hexafluoropropylene, and mixtures thereof. In another aspect, the invention includes a method of making a battery comprising: a) providing a cathode; b) providing an anode, wherein at least one of the cathode or the anode comprises PTFE and a compound selected from the group consisting of PVDF, copolymers of vinylidene fluoride and hexafluoropropylene, and mixtures thereof; and c) incorporating the cathode and the anode into a battery.

6 Claims, 4 Drawing Sheets

A) MIX POLYMERIC BINDER MATERIALS WITH AN ORGANIC SOLVENT, THE POLYMERIC BINDER MATERIALS COMPRISING PTFE AND A COMPOUND SELECTED FROM THE GROUP CONSISTING OF PVDF, COPOLYMERS OF VINYLIDENE FLUORIDE AND HEXAFLUOROPROPYLENE, AND MIXTURES THEREOF.

↓

B) COMBINE POLYMERIC BINDER MATERIALS MIXTURE WITH ELECTRODE ACTIVE MATERIAL TO FORM ELECTRODE MATERIAL MIX.

↓

C) FORM ELECTRODE MATERIAL MIXTURE INTO A THIN FILM OF COMPRESSIBLE MATERIAL.

↓

D) DRY THIN FILM TO FORM A CATHODE MATERIAL SHEET.

↓

E) PUNCH CATHODE DISCS FROM CATHODE MATERIAL SHEET.

↓

F) COMPRESS CATHODE DISCS TO FORM CATHODES.

Fig. 2

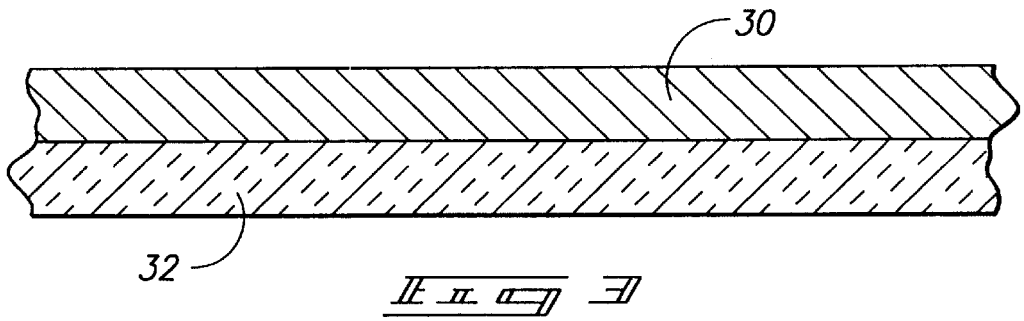
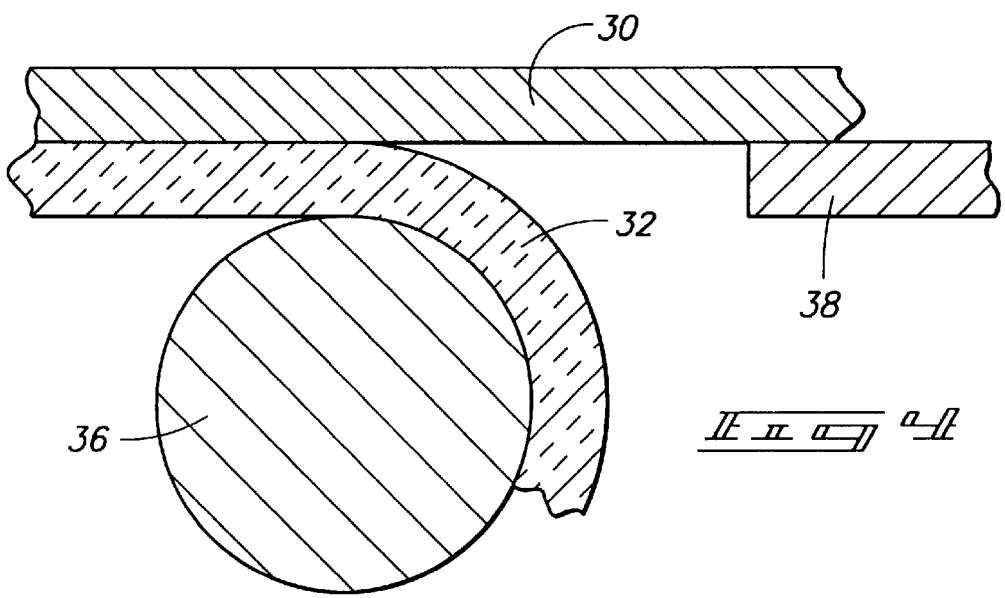
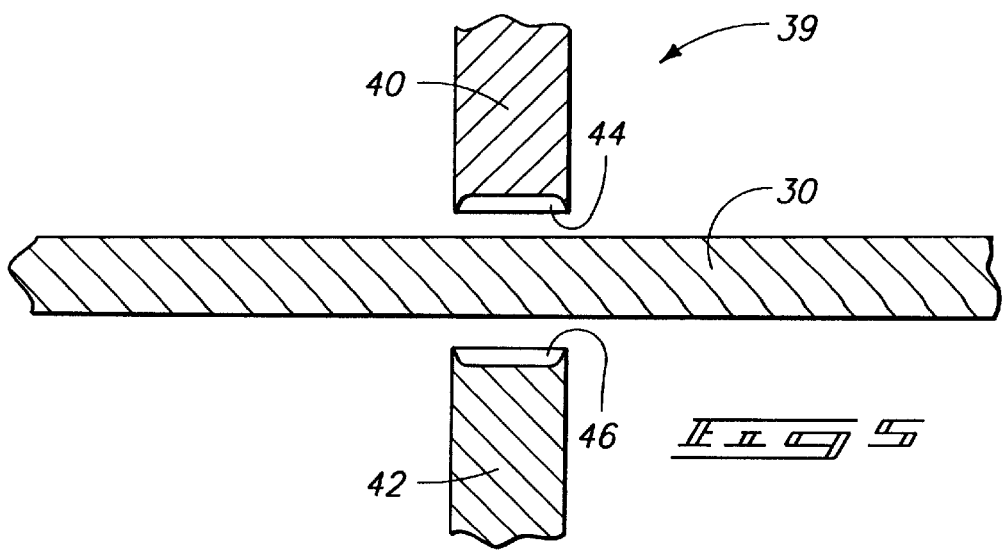

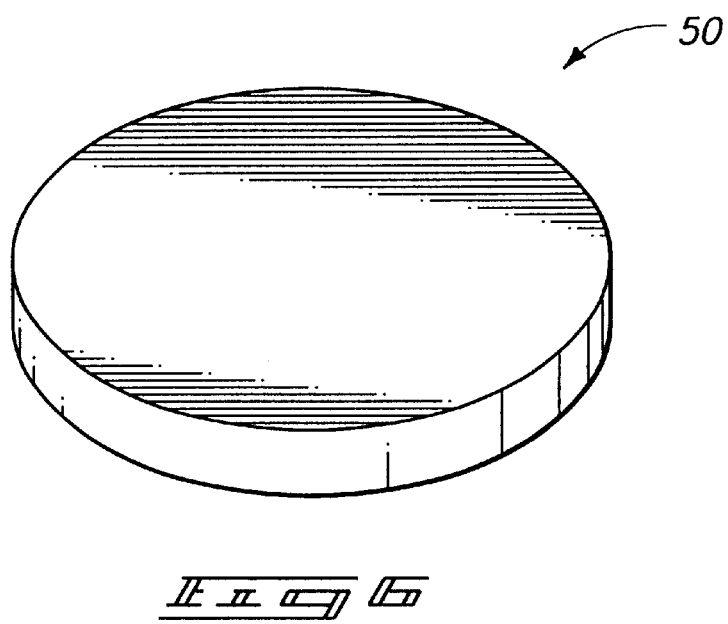
$\boxed{\exists \Box \bot \Box \Box}$ 6
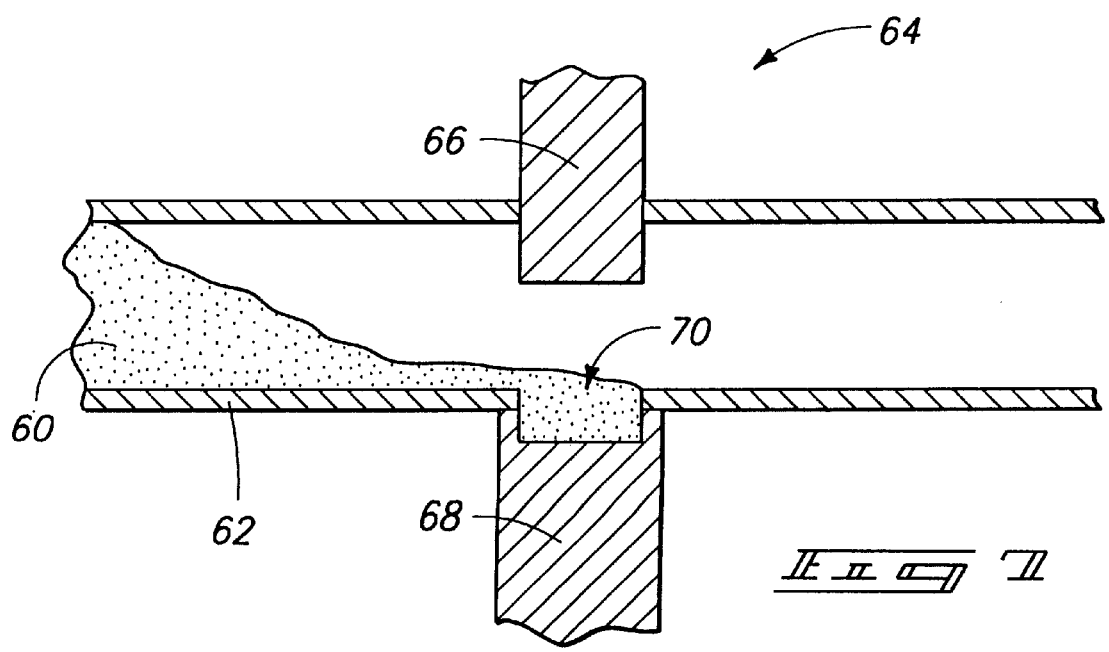
$\boxed{\exists \Box \bot \Box \Box}$ 7

BATTERY ELECTRODES, BATTERIES, AND METHODS OF FORMING BATTERIES AND BATTERY ELECTRODES

TECHNICAL FIELD

The invention pertains to batteries, battery electrodes and methods of forming batteries and battery electrodes. The invention has particular application to methods of forming very thin batteries, such as button-type batteries.

BACKGROUND OF THE INVENTION

Small, thin batteries, such as button-type batteries, are commonly used in modern devices. For instance, button-type batteries are utilized as power sources for calculators and watches.

A prior art button-type battery 10 is shown in FIG. 1. Battery 10 comprises a lower terminal housing member, or can 12, and an upper terminal housing member, or lid 14. Can 12 and lid 14 are sealingly joined together at a crimp 16. Battery 10 is typically in the shape of a circle, with crimp 16 extending entirely around a periphery of the circle. A gasket material 18 is provided within crimp 16 to form a fluid-tight seal within the crimp. A cathode 20 and an anode 22 are provided between terminal housing members 12 and 14. Cathode 20 has a thickness of greater than 13 mils. Cathode 20 and anode 22 are separated by a porous separator 24. An electrolyte 26 is provided within the battery and within porous separator 24.

Battery cathode 20 typically comprises a mixture of an active material and a conductive medium, or diluent. The active material can comprise, for example, at least one of manganese dioxide and $(CF)_x$. The conductive medium can comprise, for example, elemental carbon. The manganese dioxide provides a source of oxidizing component in a battery cell. As manganese dioxide is itself a poor conductor, the carbon is added to provide electrical conductivity. The elemental carbon is typically in the form of graphite, although other materials, such as, acetylene black may also be used. Natural graphites can be used in alkaline cells, but typically cells are made with very pure synthetic graphite to reduce impurities which might lead to corrosion in a battery cell.

A difficulty in forming battery cathodes occurs in binding an active material with a conductive medium. A goal is to develop binders which produce dense, stable cathodes having good electronic and ionic conductivity, and efficient discharge even at high discharge rates. Another goal is to develop binders which form cathodes which can be very thin, and yet durable enough to be utilized with pick and place automation. Also, a goal is to develop binders which are simple to incorporate into manufacturing processes by which battery cathodes are produced. It would be desirable to develop methods of forming battery cathodes which achieve one or more of the above-discussed goals.

There is a continuing goal in small battery fabrication to form the batteries increasingly thinner, while maintaining efficient power discharge. Limitations in battery thickness are imposed by limitations of the thicknesses of battery components, such as the anode and the cathode. Accordingly, it would be desirable to develop methods for forming thinner battery components.

SUMMARY OF THE INVENTION

The invention encompasses batteries, battery electrodes and methods of forming batteries and battery electrodes.

In one aspect, the invention includes a mixture of polytetrafluoroethylene (PTFE, also known as TEFLON™) and a compound selected from the group consisting of polyvinylidene fluoride (PVDF), copolymers of vinylidene fluoride and hexafluoropropylene, and mixtures thereof in a cathode binder.

In another aspect, the invention includes a battery electrode comprising PTFE and a compound selected from the group consisting of PVDF, copolymers of vinylidene fluoride and hexafluoropropylene, and mixtures thereof.

In another aspect, the invention includes a method of making a battery. A cathode and an anode are provided. At least one of the cathode or the anode comprises PTFE and a compound selected from the group consisting of PVDF, copolymers of vinylidene fluoride and hexafluoropropylene, and mixtures thereof. The cathode and the anode are incorporated into a battery.

BRIEF DESCRIPTION OF THE DRAWINGS

Preferred embodiments of the invention are described below with reference to the following accompanying drawings.

FIG. 2 is a flow chart of a process for forming a battery cathode according to the present invention.

FIG. 3 is a diagrammatic cross-sectional view of a cathode material being processed according to a first embodiment process of the present invention.

FIG. 4 is a diagrammatic cross-sectional view of the cathode material of FIG. 3 at a processing step subsequent to that of FIG. 3.

FIG. 5 is a diagrammatic cross-sectional view of the cathode material of FIG. 3 at a processing step subsequent to that of FIG. 4.

FIG. 6 is a perspective view of the cathode material of FIG. 3 at a processing step subsequent to that of FIG. 5.

FIG. 7 is a diagrammatic cross-sectional view of a cathode material being processed according to a second embodiment process of the present invention.

DETAILED DESCRIPTION OF THE PREFERRED EMBODIMENTS

Figure 1:
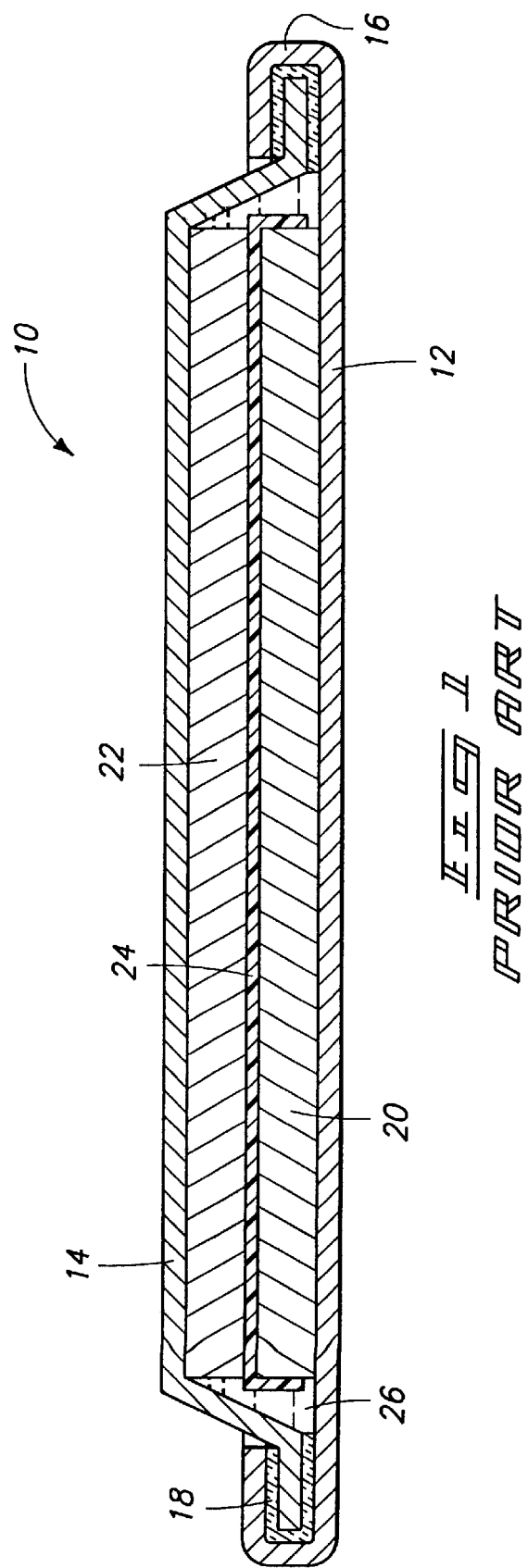
FIG. 1 is a diagrammatic cross-sectional view of a prior art button-type battery.

This disclosure of the invention is submitted in furtherance of the constitutional purposes of the U.S. Patent Laws "to promote the progress of science and useful arts" (Article 1, Section 8).

The present invention encompasses methods of forming thin cathodes for thin profile batteries. A first embodiment method of the present invention is described in a flow chart of FIG. 2, as well as with the diagrams of FIGS. 3–6. The method utilizes polymeric binder materials comprising polytetrafluoroethylene fluoride (PTFE) and a compound selected from the group consisting of polyvinylidene fluoride (PVDF), copolymers of vinylidene fluoride and hexafluoropropylene, and mixtures thereof. The polymeric binder materials are utilized as a binding agents in a cathode to, for example, bind carbon and $MnO_2$. The PVDF is a homopolymer of 1,1-difluoroethene (vinylidene fluoride). A preferred ratio of PTFE to the compound is from about 90:10 to about 10:90. A more preferred ratio is from about 70:30 to about 30:70.

Referring to FIG. 2, a first step in the process (step "A") is to mix the polymeric binder materials with an organic solvent to form a mixture. The organic solvent can comprise any solvent capable of dissolving the polymeric binder materials, such as, for example, acetone, methyl ethyl ketone, tetrahydrofuran (THF) or N-methyl pyrrolidone. The solvent can also be a blend of, for example, THF and N-methyl pyrrolidone. If the solvent is a blend of THF and N-methyl pyrrolidone, the ratio of THF to N-methyl pyrrolidone will preferably be from about 50:50 to about 99:1 (by volume), with about 94:6 being most preferred. Preferably, from about 4% to about 8% (by weight) of the polymeric binder materials is provided in the solvent at room temperature and room pressure to achieve dissolving. More preferably, about 6% (by weight) of the polymeric binder materials is provided in the solvent.

In step "B", the polymeric binder material mixture is combined with electrode active materials and a conductive medium to form an electrode material mixture. Examples of electrode active materials are $MnO_2$ and $(CF)_x$. An example conductive medium is carbon.

In step "C", the electrode material mixture is formed into a thin film of compressible material. Methods for forming the electrode material mixture into a thin film of compressible material include, for example, solvent casting, extrusion, or drying into a powder. FIG. 3 is a diagrammatic view of a thin compressible film 30 formed by solvent casting or extrusion over a removable substrate 32. Substrate 32 can comprise, for example, a polyester film. If thin film 30 is formed by solvent casting, the electrode material mixture can be applied to substrate 32 as a low viscosity liquid and then dried to remove organic solvents from the film and form the compressible material 30. Thin film 30 is preferably about 0.04 inches thick when it is initially cast as a wet film. The film is then dried at, for example, 80° C. for about 30 minutes to remove organic solvent from the film and to decrease the thickness to a thickness of from about 13 mils to about 15 mils. The drying of thin film 30 is indicated as step "D" of FIG. 2.

If thin film 30 is formed by extrusion, the electrode material mixture can be passed through an extruder in a relatively high viscosity form to form the resultant thin film 30. A thin film 30 formed by an extrusion process can be placed on a removable substrate 32 as shown, or it can be fed directly to a pellet punch (described below with reference to FIG. 5).

Appropriate viscosities of an electrode material mixture for utilization in solvent casting processes or extrusion processes are known to persons of ordinary skill in the art.

Referring to FIG. 4, removable substrate 32 is separated from thin film 30 to release the thin film as a cathode material sheet. Methods for separating removable substrate 32 from thin film 30 are known to persons of ordinary skill in the art. Such methods can include adhering removable substrate 32 to a roller device 36 and pushing thin film 30 onto a support structure 38.

Referring to steps "E" and "F" of FIG. 2, a cathode disk is punched from the cathode material sheet, and compressed to form a cathode. In a preferred embodiment of the present invention, the punching and compressing occur in a common step as shown in FIG. 5. Thin film sheet 30 is placed within a punch 39 comprising a pair of spaced punch dies 40 and 42. Punch dies 40 and 42 are preferably circular in horizontal cross-sectional shape (not shown), and preferably comprise recesses 44 and 46, which are less than about 4 mils deep. Dies 40 and 42 are forced together to compress sheet 30 between them and to punch a cathode disk 50 (shown in FIG. 6) from sheet 30. Referring to FIG. 6, cathode disk 50 is preferably circular in shape, and preferably comprises a thickness of less than about 9 mils, and more preferably of less than about 8 mils. Cathode disk 50 is thus very thin. Cathode disk 50 is also durable enough to be utilized with pick and place automation. Cathode disk 50 may be incorporated into a button-type battery (such as the battery shown in FIG. 1) as an operable cathode. Once incorporated into a battery, cathode disk 50 is found to have efficient discharge properties. For example, a cathode disk of the present invention will have a discharge rate of about 5 milliamps/cm$^2$.

The PTFE and the compound selected from the group consisting of PVDF, copolymers of vinylidene fluoride and hexafluoropropylene, and mixtures thereof preferably comprise from about 3% to about 10% (by weight) of finished cathode disk 50. More preferably, the PTFE and the compound comprise from about 3% to about 8% (by weight) of cathode disk 50.

Although the above-discussed process removed substrate 32 from thin film 30 prior to subjecting thin film 30 to punch 39, alternative processes can be used in which substrate 32 is not removed until after punching a cathode disk from material 30. In such alternative processes, the recesses formed in punch dies 40 and 42 can be deeper than 4 mils to accommodate the extra thickness of substrate 32.

Also, in alternative methods of the invention, the cutting of a cathode disk can occur before, or after, compressing cathode material 30 to a thickness of less than 9 mils. Methods for cutting cathode material 30 before or after compressing material 30 will be recognized by persons of ordinary skill in the art.

An alternative method of the present invention is described in reference to FIG. 7. In FIG. 7, a cathode powder material 60 is provided onto a conveyor sheet 62 which conveys the material to a press 64. Powder 60 can be formed from the above-discussed electrode mixture of polymeric binder materials, $MnO_2$, and carbon by drying the mixture and subsequently pulverizing or grinding the mixture into a powder. Press 64 comprises a die 66 and a die receptacle 68. Die receptacle 68 comprises an orifice 70 configured for receiving die 66. Die 66 and orifice 70 preferably have a circular cross-sectional shape along a horizontal cross-section (not shown). The powder within orifice 70 is compressed by die 66 to form a cathode disk having dimensions preferably identical to the preferable dimensions discussed above regarding disk 50 of FIG. 6. After the cathode disk is formed within orifice 70, the disk can be removed by methods known to persons of ordinary skill in the art. Such methods can include sliding a punch (not shown) into the bottom of orifice 70 to expel the cathode disk from the orifice.

An example composition of a cathode of the present invention is as follows.

EXAMPLE

| Component | Range |
| --- | --- |
| Manganese Diozide | 80–91% |
| Carbon | 6–10% |
| Polymeric Biner material | 3–10% |

Although the invention has been discussed primarily with reference to applications in which cathodes are formed, the invention also encompasses methods of forming other battery components, such as anodes. For instance, in applications in which anodes are formed from mixtures of materials, the mixtures can be bound together in accordance with the present invention with a polymeric binder comprising PTFE and a compound selected from the group consisting of PVDF, copolymers of vinylidene fluoride and hexafluoropropylene, and mixtures thereof in a cathode binder.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A button-type battery comprising:
    a button-type battery cathode disk having a thickness of less than 8 mils;
    an anode;
    wherein the cathode disk comprises $MnO_2$, $(CF)_x$, and a polymeric binder material consisting of PTFE and a compound selected from the group consisting of PVDF, copolymers of vinylidene fluoride and hexafluoropropylene, and mixtures thereof and wherein the PTFE and the compound are present in a weight ratio of from about 70:30 to about 30:70, and wherein the PTFE and the compound comprise from about 3% to about 8% (by weight) of the cathode disk.

2. The battery of claim 1 wherein the cathode disk exhibits a discharge rate of about 5 milliamps/cm$^2$.

3. A method of making a button-type battery cathode disk comprising:
    forming a polymeric binder material consisting of PTFE and a compound selected from the group consisting of PVDF, copolymers of vinylidene fluoride and hexafluoropropylene, and mixtures thereof and mixing the polymeric binder material with $MnO_2$ and $(CF)_x$ to form a cathode material mixture; and
    forming the cathode material mixture into a button-type battery cathode disk having a thickness of less than 8 mils, wherein the PTFE and the compound are present in a weight ratio of from about 70:30 to about 30:70, and wherein the PTFE and the compound comprise from about 3% to about 8% (by weight) of the cathode disk.

4. The method of claim 3 further comprising forming the cathode by solvent casting.

5. The method of claim 3 further comprising forming the cathode by film extrusion.

6. The method of claim 3 further comprising forming the cathode by powder processing.

* * * * *

UNITED STATES PATENT AND TRADEMARK OFFICE
CERTIFICATE OF CORRECTION

Page 1 of 1

PATENT NO. : 6,114,061
DATED : September 5, 2000
INVENTOR(S) : Eric R. Dix; Weihong Li It is certified that error appears in the above-identified patent and that said Letters Patent is hereby corrected as shown below:

<u>Column 4,</u>
Line 60, replace "Diozide" with -- Dioxide --

Signed and Sealed this

Twenty-third Day of October, 2001

Attest:

*Nicholas P. Godici*

NICHOLAS P. GODICI
*Acting Director of the United States Patent and Trademark Office*

*Attesting Officer*